March 26, 1935.　　　W. A. SCHOPPE　　　1,995,627
DISPENSING DEVICE FOR MUSTARD AND THE LIKE
Filed April 30, 1934
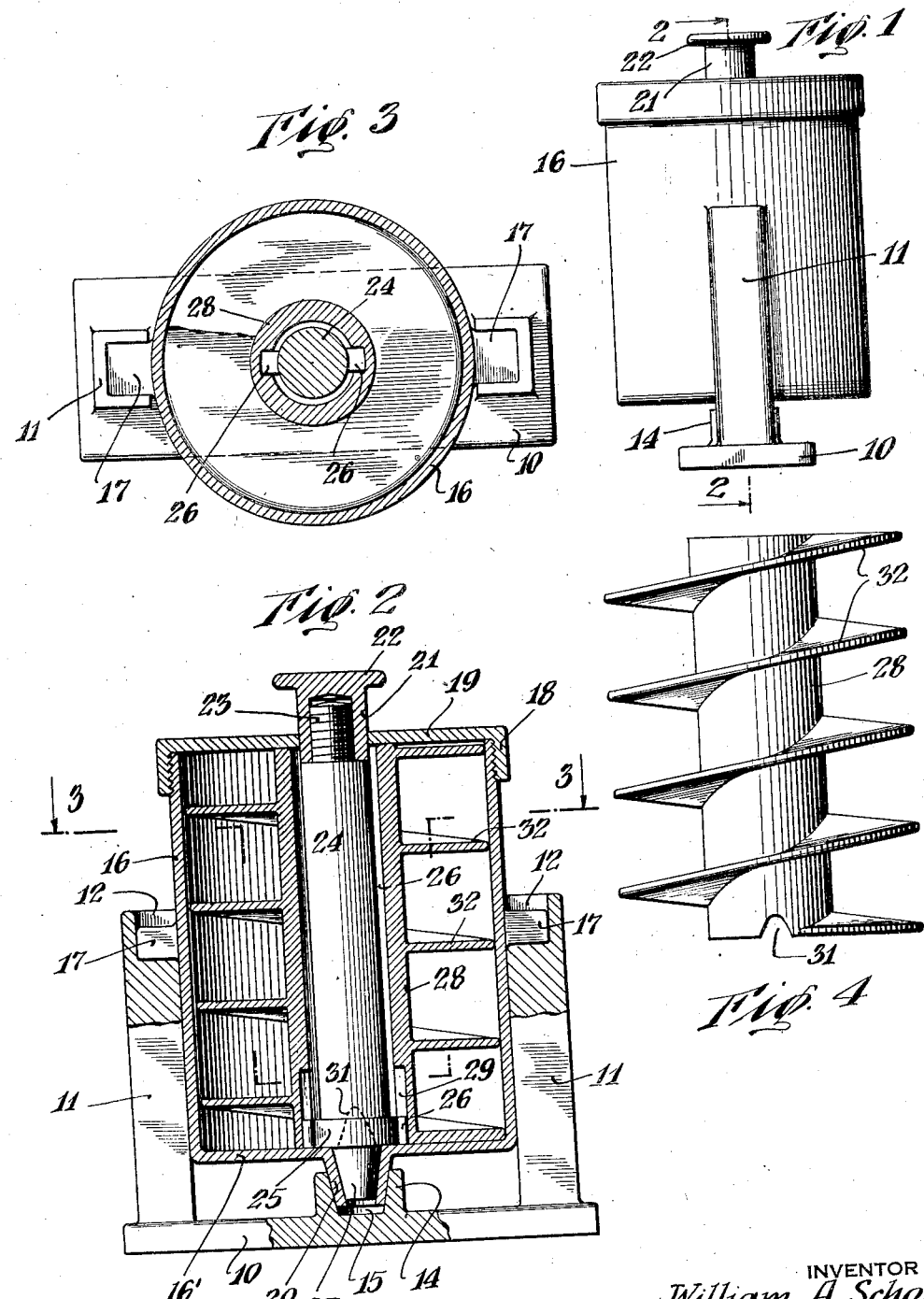
INVENTOR
William A. Schoppe
BY
ATTORNEY Patented Mar. 26, 1935

1,995,627

UNITED STATES PATENT OFFICE 1,995,627

DISPENSING DEVICE FOR MUSTARD AND THE LIKE

William A. Schoppe, Geneva, Ill.

Application April 30, 1934, Serial No. 723,140

2 Claims. (Cl. 221—67)

This invention relates to accessories for dining tables, lunch carts, cafeterias, restaurants and the like, and more particularly to devices used in dispensing plastic or semi-liquid matter, such as preparations of mustard, dressing, mayonnaise etc.

The usual containers for mustard and the like are objectionable in that insects of various kinds may come in contact with the preparations and enhance the spread of germs. They are furthermore open to objection of rapid evaporation, and the spoon, laddle or spatula commonly used in delivering a portion is highly unhygienic besides entailing a very considerable loss.

It is therefore an object of the present invention to provide a dispensing container which is completely closed and which positively prevents insects from coming in contact with its contents.

A further aim of this invention is the provision of a dispensing device from which any desired quantity may be removed and placed wherever desired.

A still further feature is in the provision of an ornamental apparatus for serving definite portions of its contents in an easy manner, without previous experience.

And yet another object is the provision of a sanitary device for containing plastic substances and having means for positively forcing the contents out in such quantities as may be desired.

These and other advantageous aims and objects are attained by the novel design, construction and combination of parts, hereinafter described and shown in the associated drawing, forming an essential part of this disclosure, and in which:

Figure 1 is a side elevational view of an embodiment of the invention.

Figure 2 is a longitudinal sectional view shown on line 2—2 of Figure 1, and drawn to an enlarged scale.

Figure 3 is a transverse sectional view, taken on line 3—3 of Figure 2.

Figure 4 is a side elevational view of the impeller in detail.

Referring in greater detail to the drawing, the numeral 10 designates the base of the device, the same being generally an elongated rectangle, having a smooth bottom and provided with two spaced uprights 11 having at their upper end recesses 12. Centrally on the upper surface of the platform or base 10 is a raised boss 14 having a conical opening 15, as best seen in Figure 2.

A container 16, of circular cross-section, is provided with lugs 17, oppositely disposed and adapted to rest in the bottoms of the recesses 12, and is provided at its upper end with screw threads to engage with corresponding threads in the downreaching skirt 18 of a cover 19.

Centrally of the bottom wall 16' of the container is a downreaching hollow cone 20, suited to engage in the conical recess 15 of the base, preventing the container from swinging on the support lugs 17.

Closely fitting a central opening in the cover plate 19, is a stem 21, provided with a knob 22 which may be corrugated, this knob extending upward into position for ready access by an operator.

Screw threaded into the stem 21 is a shank 23 of a cylindrical bar 24, the same being adapted to pass through an opening in the cover 19, and having at its lower end an integral collar 25 provided upon two of its opposite sides with key-like lugs 26. The bar 24 had in its lower end, beyond the collar 25, a conical valve 27, suited, when in its lowermost position, to enter and fill the conical cavity in the projection 20 of the container bottom.

Surrounding the bar 24 is a sleeve 28 having at opposite points a longitudinal slot 29, receptive of the key-like lugs 26, which are slidably engaged therein.

The sleeve 28 is provided at its lower end with one or more open recesses 31, and rests on the bottom wall 16' of the container, while its upper end is retained within the container, due to the contact with cover 19.

Formed on the exterior of the sleeve 28 is a helical outstanding web 32, the outer edge of which is in close proximity with the interior of the container wall 16.

In operation, the cover, sleeve and its integral helix being removed, the container may be supplied with the substance to be used, whereupon the sleeve and helix are inserted, the collar 25 placed in position from the bottom side, and engagement made with the knob 22, the arrangement being such, that the valve 27 is closed upon its seat and the key-like lugs 26 engaged within the slideways 29, whereupon the device, as a unit, is removed from its support, the knob 22 turned in the proper direction to force the contents of the container outward through the passage way 31 in the sleeve and thence downwardly through the discharge seat 20, whenever it may be desired.

From the foregoing it will be seen that a simple device for this purpose has been disclosed in the preferred form of its embodiment, but it is not desired to restrict the details to the exact construction shown, it being obvious that changes, not involving the exercise of invention may be made without conflicting with the scope of the appended claims.

Having thus described the invention, what is claimed as new and desired to be secured by Letters Patent, is:

1. A dispenser for plastic materials comprising a base having uprights provided with recessed seats, a cylindrical container having lugs adapted to engage said seats, a cover removably engaged over said container, a valve seat at the bottom of the container, a valve rotatably mounted in the container engageable in said seat, a stem on said valve, means to rotate said stem, a cylinder surrounding the stem and actuated thereby, and a helical vane fixed on said cylinder to extend the full length thereof, the edge of said vane extending to the valve of said container to force the contents of the container through the valve.

2. In a dispenser for mustard or the like, a cylindrical container having a conical valve seat at one end and a cover at the opposite end, means to support the container, a valve engageable with said seat, said valve having a bar extending centrally through said container and cover, a sleeve keyed to said bar, and a helix formed on said sleeve fitting said container.

WILLIAM A. SCHOPPE.